Nov. 7, 1967    H. M. HARVEY ETAL    3,351,095
MIXING AND VOLUME CONTROL FAUCET
Filed April 26, 1965    3 Sheets-Sheet 1
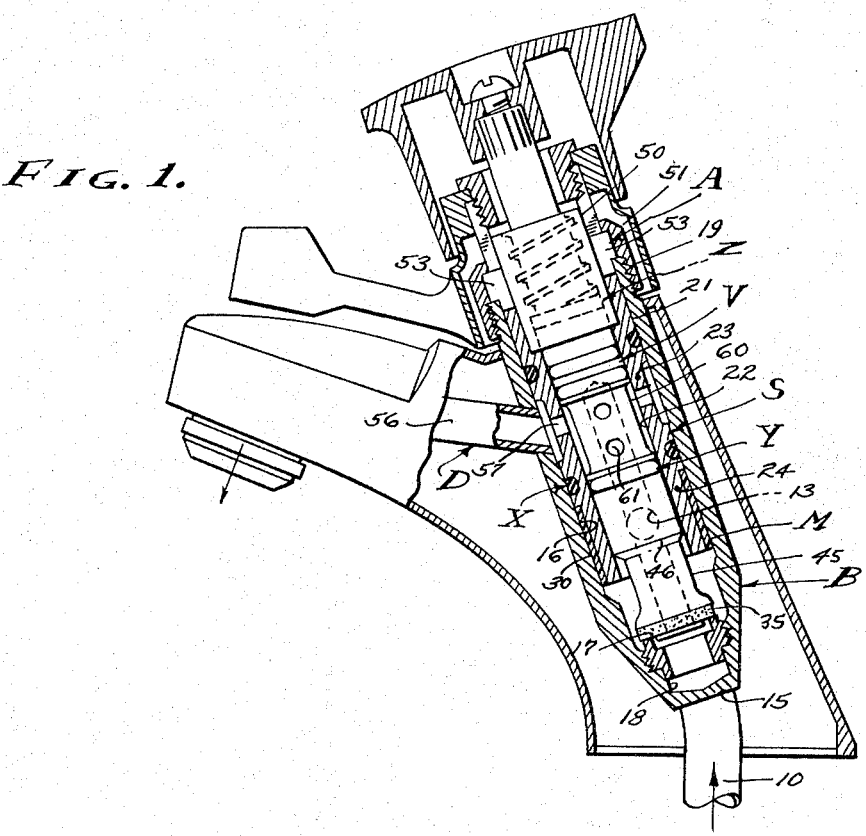
FIG. 1.
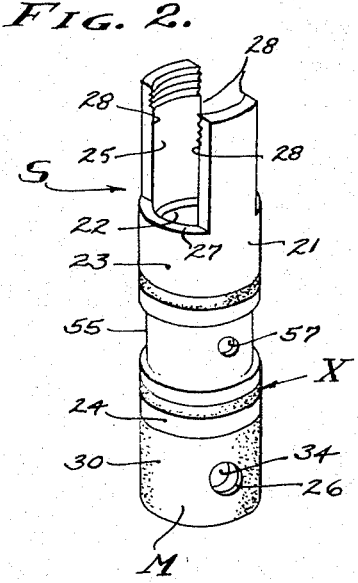
FIG. 2.
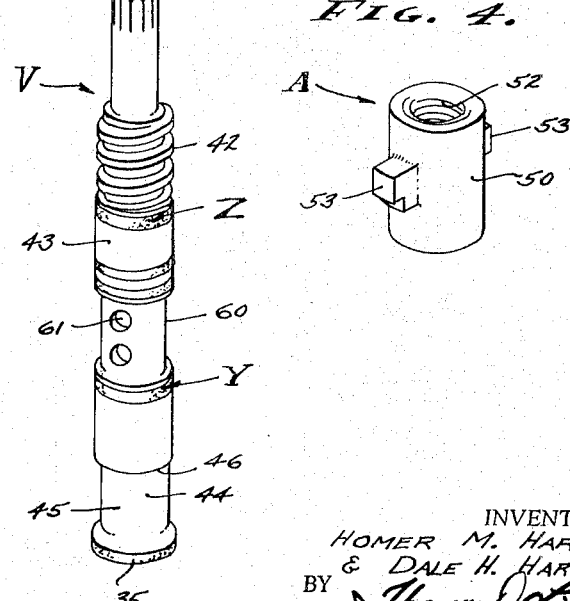
FIG. 3.
FIG. 4.
INVENTORS.
HOMER M. HARVEY
& DALE H. HART
BY
Attorney
and
Agent

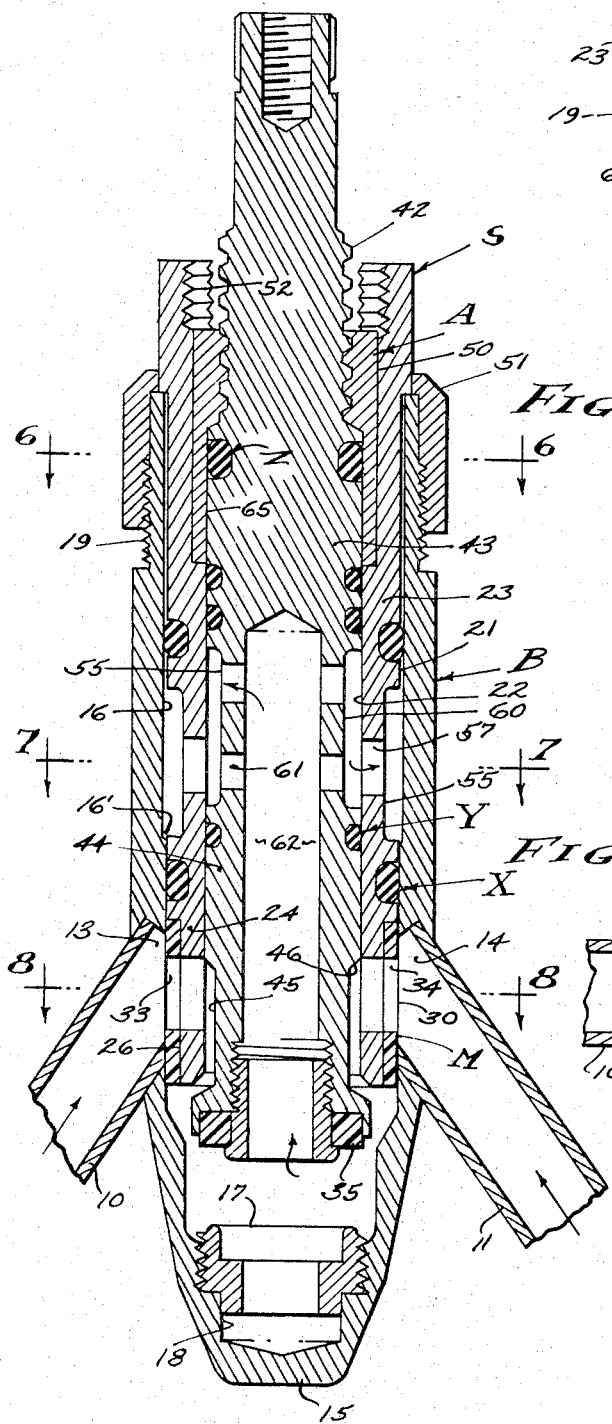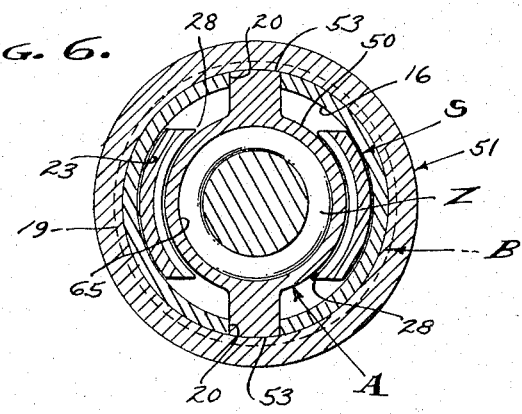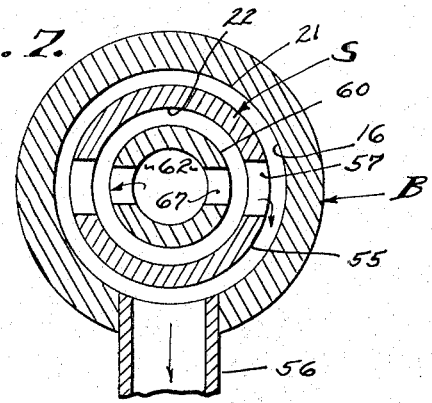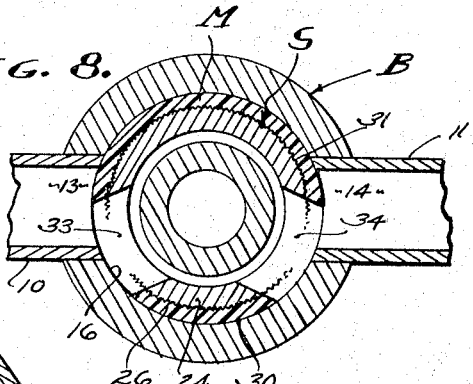

Nov. 7, 1967
H. M. HARVEY ETAL
3,351,095
MIXING AND VOLUME CONTROL FAUCET
Filed April 26, 1965
3 Sheets-Sheet 3
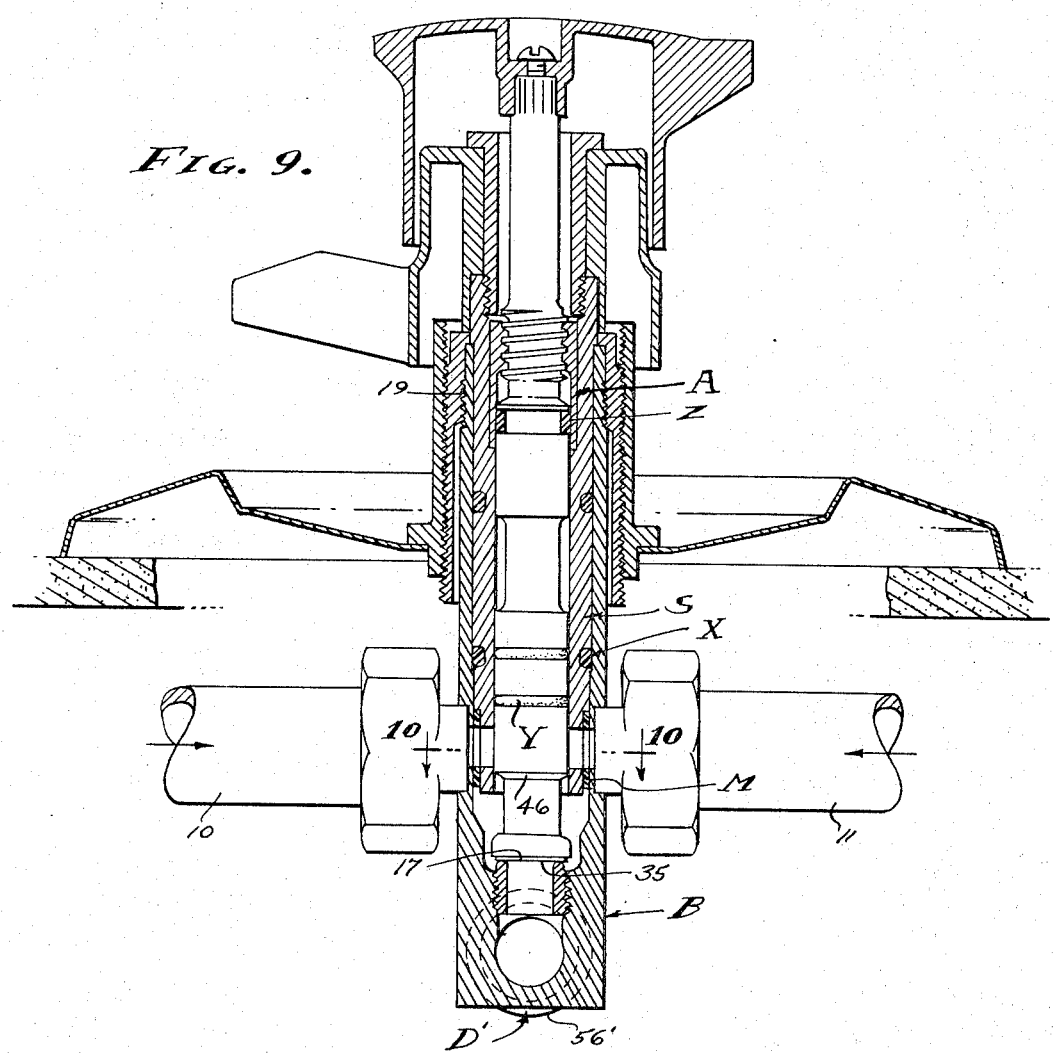
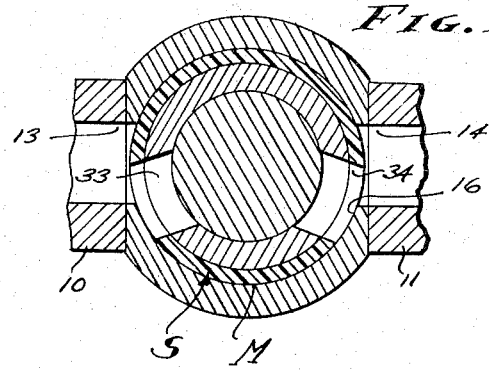
INVENTORS.
HOMER M. HARVEY
& DALE H. HART

United States Patent Office 3,351,095
Patented Nov. 7, 1967

3,351,095
MIXING AND VOLUME CONTROL FAUCET
Homer M. Harvey, Los Angeles, and Dale H. Hart, Long Beach, Calif., assignors to Harvey Aluminum (Incorporated), Torrance, Calif., a corporation of California
Filed Apr. 26, 1965, Ser. No. 450,841
9 Claims. (Cl. 137—637.4)

ABSTRACT OF THE DISCLOSURE

A dual control faucet involving two elements independently operable to govern mixing and volume of fluid delivered, the two elements being received within a body, the mixing element being a sleeve having cylindrical surfaces in contact with internal cylindrical walls of the body and being rotatable to control the proportion of fluids, the volume control element being concentrically disposed within the mixing element sleeve, and a combination control, stop and restraining element acting between the body and each of the elements to provide means for reciprocating the volume control element, to provide limits to rotation of the mixing element and to hold the two elements and the body in assembled relation.

---

Mixing valves as such are in common use, and they are employed for example as faucet fixtures to control hot and cold water, to mix the two liquids in the desired proportions and to control the volume or delivery and stoppage thereof. The prior art discloses valves of this type wherein double valves and/or single element valves are employed, resort being made to rather complicated constructions. For instance, many valves of this type have axially disposed seats for both mixing and stoppage of fluid and thereby lose full advantage of the pressure balancing features that are possible with cylindrical porting. Many such valves resort to pressure balancing systems which are complex and require numerous seals. Further, many such valves of this type have employed O-ring type seals at the variably opening mixing ports, and because of eclipsing of these ports relative to such seals there has occurred an obvious cutting effect that destroys said seals. As a result of comparison between axial and sleeve types of seals, it now becomes apparent that an axially opening valve is best suited for volume and/or a positive shut-off, while a cylindrically opening or sleeve valve is best suited for mixing, and it is a general object of this invention to provide a dual element valve of the type under consideration wherein volume and mixing functions are independently controlled by axially opening and sleeve type valves respectively.

An object of this invention is to provide a mixing and volume control valve involving, primarily, two fluid controlling elements, one of which moves axially within the other and the said other which moves rotatably, and wherein each of said elements has incorporated therein a fluid seal that ensures its intended function and wherein each of said elements has incorporated therein a friction means that ensures its individual function without affecting movement of the other valve element related thereto.

Another object of this invention is to provide a dual element valve characterized by coaxially related valve elements which are telescopically engaged for their cooperative operations, and wherein a single nut and stop structure is carried by the enclosing body to serve in the dual and cooperative capacity as a nut for the axially movable valve element and as a stop limiting revolvement of the sleeve valve element.

It is another object of this invention to provide a mixing and volume control valve wherein the metering of flow is effected at the mixing ports and whereby the final shut-off and/or sealing is effected independently of said mixing ports. And, it is another object to prevent intermix of hot and cold water from separate sources when the faucet is closed, by closing off the two sources from each other. The two primary and telescopically related valve elements are independently operable through their cooperative relationship to the housing, in order to effect the respective functions of mixing and shut-off, and said valve elements are also cooperatively interrelated in order to effect the function of metering the volume of flow.

Further, it is an object of this invention to provide a mixing and volume control valve unit of the character referred to wherein fluid is combined from laterally disposed incoming lines and is commingled in a chamber from which chamber the mixing fluid can be most advantageously dispensed as circumstances require. With the present invention it is advantageous to employ the central valve element as a fluid conductor so as to transport the mixed fluid axially of the valve structure for delivery intermediate the ends thereof or at or near the control end of the valve housing. On the other hand, it is also advantageous to employ the end of the housing opposite the control end as the discharge area of the structure. Therefore, and as will be apparent from the drawings and following description, two preferred embodiments of the valve unit of the present invention will be described.

The various objects and features of this invention will be fully understood from the following detailed description of the typical preferred forms and applications thereof, throughout which description reference is made to the accompanying drawings, in which:

FIG. 1 is a sectional view of the faucet showing the center volume element stem and the nut and stop means of the present invention in elevation.

FIGS. 2, 3 and 4 are perspective views of the three structural elements that are contained within the body of the faucet shown in FIG. 1; FIG. 2 showing the mixing element sleeve, FIG. 3 showing the volume element stem and FIG. 4 showing a part of the nut and stop means and which threadedly engages the stem shown in FIG. 3 in order to reciprocate the same and which provides a stop for limiting rotation of the sleeve shown in FIG. 2.

FIG. 5 is an enlarged detailed section view showing the principal elements of the faucet in an open condition.

FIGS. 6, 7 and 8 are transverse sectional views taken as indicated by lines 6—6, 7—7 and 8—8 on FIG. 5.

FIG. 9 is a view similar to FIG. 1 showing a second and modified form of the present invention; and FIG. 10 is an enlarged transverse sectional view taken as indicated by line 10—10 on FIG. 9.

The valve herein disclosed is a mixing and volume control valve wherein infinitely variable balance of flow is gained as between two fluid supply lines 10 and 11, wherein the commingled fluid is metered, and wherein mixed and metered fluid is shut off and to the end that the valve, or faucet, is dripless and said two fluid supply lines are isolated from each other when the valve is in the off position. In actual practice, two fluid supply lines are practical in use, one a cold water line 10 and the other a hot water line 11. These two lines connect to the valve body or housing and continuously supply water under pressure to inlet ports 13 and 14 that open radially into the valve body. These ports can be rotatably positioned as required, and they are preferably located diametrically opposite each other. Further, these two ports are positioned in a common plane normal to the central axis of the valve, the valve body or housing being elongated and disposed on said central axis to movably receive the two actuable valve elements which characterize the present invention. In accordance with the invention the valve body or housing is open at one end for insertion of the said two valve elements, said open end of the housing being closed by a unique nut and stop structure. In accordance with the invention a delivery connection D and/or D' is located relative to the body or housing as circumstances require and as typically illustrated in the two forms of the invention shown.

The valve unit involves, generally, a body or housing B to which the fluid lines 10 and 11 attach and from which the delivery connection D and/or D' projects, a mixing element S in the form of a sleeve that is revoluble within the body B, a volume element V in the form of a stem that reciprocates within the sleeve S, and a nut and stop element A that cooperatively serves as a nut for the stem V and as a revolvement stop for the sleeve S while simultaneously acting as a retainer which maintains the parts B, S and V in an assembled condition. In addition to the foregoing general elements, the valve unit involves a unique arrangement of seals and cooperatively related friction means, whereby independent and reliable mixing and/or volume control of fluid is gained. As shown, the revolvable mixing element S is sealed with the body B by a sleeve-seal X, the reciprocable volume element V is sealed with the elements S by a stem-seal Y, and there is a friction means Z that restrains relative rotation between the parts S and V.

The body B, or housing, is an elongated tube of cylindrical formation, closed at its bottom end 15 and opened at its top end. In both forms of the invention shown the body B remains the same, except for the arrangement of delivery connections D and/or D'. In accordance with the invention the body B has an essentially straight but preferably stepped cylindrical bore 16 terminating at an axially disposed seat 17 spaced from the bottom end 15 and faced toward the open end of the body. As shown, there is a step 16' located at the sleeve-seal X in order to facilitate assembly, by clearing a seal M later described. The seat 17 presents an annular shoulder in a plane normal to the axis of the valve and it opens into a counterbore 18 of substantially lesser diameter than the bore 16, the said counterbore establishing a discharge chamber beneath said seat. In practice, the seat 17 is removable and to this end it is a tubular part threadedly carried in the body B at the juncture of the bores 16 and 18.

A feature of the invention is the relationship of the body B to the element A, and wherein the body B is provided with features adapted to gain the cooperative relationship above referred to and attributed to said element A. To this end the exterior of the body B is provided with means 19 to fasten the element A to the body B and with means 20 to key the element A to the body B against rotation relative thereto. The said means 19 is preferably a simple screw thread while the means 20 is one or more notch-shaped openings. In practice, the said means 20 involves a pair of diametrically opposite slots formed as by the transverse motion of a milling cutter, or the like, passed through the walls of the body at the open end thereof.

The mixing element S, or sleeve S, is an elongated tube of cylindrical formation that extends substantially the length of the bore 16, and freely rotatable in the bore 16, and that projects from the open end of the body B. In both forms of the invention shown the sleeve S remains the same, except for the location of seals necessitated by the positioning of the delivery connections D or D' and by variations in the control handle configurations. In accordance with the invention the sleeve S has a smooth and straight cylindrical exterior 21 insertable into and rotatably slideable in the bore 16, and it has a smooth and straight bore 22 extending continuously therethrough and opening at both the top and bottom sections 23 and 24 thereof. In accordance with the invention the top section 23 is the control section and has an internal counterbore 25 that accommodates the nut-stop means A hereinafter described, and the bottom section 24 is the mixing section and has an external reduced diameter 26 that accommodates a mixing seal M which engages in the lowermost and inwardly stepped portion of the bore 16. The sleeve S need not be stepped.

The control section 23 of the sleeve S extends from within the body B to be exposed at or preferably to project well beyond the top end of the body. In accordance with the invention diametrically opposite sides of the section 23 are removed to a plane at or adjacent the lower extremity of the slot-shaped notches of means 20, presenting upwardly faced shoulders 27 in a common plane normal to the axis and presenting circumferentially spaced stops 28. The stops 28 are symmetrically formed at opposite sides of the sleeve S by traversing the section 23 with a straddle milling operation, or the like, in which case the section 23 becomes characterized by a pair of upstanding columns and each of which has opposite circumferentially disposed edges forming said stops 28. This above described structure is cooperatively related to the nut-stop element A to be described.

The mixing section 24 of the sleeve S extends into the body B to terminate substantially above the seat 17 for the establishment of a mixing chamber above the seat and leading to the above mentioned discharge chamber beneath the seat. In accordance with the invention the reduced diameter 26 is provided for the retention thereon of the mixing seal M of yieldable and resilient material having fluid mixing ports 33 and 34 incorporated therein for cooperation with the ports 13 and 14 above described. As illustrated, the ports 13 and 14 are diametrically opposite and are like sized circular openings that discharge radially into the bore 16. The mixing seal M is a cylindrical sleeve that is secured by pressing the same onto the reduced diameter 26, and the seal M has an exterior diameter 30 at least as great as the diameter of the mixing element S and preferably somewhat greater. In carrying out the invention the greatness of the seal diameter will vary depending upon the plasticity and/or resilience and elasticity of the material forming the said seal. For example, the seal M is made of "Teflon," a fluorocarbon plastic and more specifically tetrafluoroethylene plastic as manufactured by du Pont de Nemours & Co., Inc., In accordance, the said reduced diameter 26 is impressed with a surface that clutches the seal M, and as shown it is impressed with longitudinally disposed ribs such as knurling 31. The said ports 33 and 34 are continued through the walls of the sleeve S to open radially therethrough, and thus it will be apparent that the sleeve S can be revolubly positioned relative to the body B to receive half flow from each port 13 and 14 or that it can be revolubly positioned so as to increase the flow from one of said ports while decreasing the flow from the other of said ports, and further that either port 13 or 14 can be cut off as circumstances require. During said revolvement of element S within the bore 16 the ported mixing seal M assuredly revolves with said sleeve S with its exterior diameter 30 yieldingly pressed against said bore 16 for sealing engagement surrounding the ports 13 and 14.

Valve element V is actuable independently of the mixing element S and independently shuts off the flow of fluid while cooperating with the said mixing element or sleeve S to meter the flow of commingled fluid. Said independency of the element S and element V has to do with their relative movements while a cooperation exists therebetween for the function of metering flow separately from the function of shut-off of fluid. The valve element or stem V is an elongated part that extends through the sleeve S to project into the mixing chamber below the sleeve section 24 and to project above the section 23. In accordance with the invention the stem V is a reciprocable part that is actuably positioned to removably engage a valve 35 with the seat 17. To this end the said valve 35 is a circular part disposed in a plane normal to the axis and parallel to the plane of said seat. The valve 35 is preferably a renewable valve in the form of a ring shaped unit threadedly carried on the lower terminal end of the stem V.

The elongated stem V is characterized by its fitted sliding engagement in the bore 22 of element S, to reciprocate relative to the sleeve element S. In accordance with the invention the stem V is sectional with an upper actuating section 43 and a lower mixing section 44. The stem V is rotatable with the upper section 43 thereof provided with an actuating thread 42 for actuation in the element A. The lower mixing section 44 is turned at 45 to a substantially lesser diameter than the bore 22, with a metering step 46, preferably inclined as shown, that is moved over the axial extent of the ports 33 and 34. As is clearly shown in the drawings, the step 46 is disposed in a plane normal to the axis and is movable from a position above the ports 33 and 34 to a position below the same whereupon the valve 35 engages the seat 17. Thus, the step 46 gradually decreases and eliminates the flow of fluid prior to engagement of the valve 35 and seat 17. As is shown, the turned part 45 of the stem V projects from the sleeve S at all times and establishes an annular chamber into which the two fluids are entered and commingled.

The nut and stop element A is provided as a fixedly positioned part serving as the nut for engagement with the actuating threads 42 of the volume element or stem V and as the stop for engagement with the stops 28 limiting revolvement of the mixing element or sleeve S. It is preferred that element A be fabricated of two pieces and in accordance with the invention there is a head 50 and a retainer 51 securing the head to the body B. The head 50 comprises a tubular part that reciprocably passes the stem V and which bridges diametrically across the open upper end of the body B. To this end the head 50 has internal threads 52 to mate with the threads 42 on the stem and has like diametrically opposite radially projecting ears 53 fitted with and supported in the notches of means 20. The ears 53 are stepped so as to center the head 50 within the body B while the retainer 51 captures the said ears so as to hold the element A in operative position. The said ears 53 are of limited and predetermined circumferential extent, whereby the above described spaced stops 28 are engaged therewith to limit rotation of the sleeve S.

The sleeve-seal X which is provided to seal the revoluble sleeve S with the body B involves a gland that is operable between the bore 16 and the exterior 21 of the said sleeve. In accordance with the invention the sleeve-seal X is placed above the mixing seal M and is preferably an O-ring type seal accommodated in a groove formed in the exterior of the sleeve S, to the end that the bore 16 remains smooth and uninterrupted. In the first form of the invention wherein the delivery connection D discharges at a level intermediate the top and bottom of the faucet structure, the sleeve-seal X involves a pair of axially spaced glands that are operable between the bore 16 and the exterior 21, the same as above described. However, in this instance the said glands are accommodated in grooves formed in the sleeve S both above and below a spool portion 55 of reduced diameter therein and which aligns axially with a discharge tube or spout 56. Further, the sleeve S is provided with radial ports 57 opening from the bore 22 and into the spool portion 55 that establishes an annular discharge chamber placed between the two glands of the sleeve-seal X.

The stem-seal Y which is provided to seal the reciprocable (and rotatable) stem V with the sleeve S involves a gland that is operable between the bore 22 and the exterior of the said stem. In accordance with the invention the stem-seal Y is also placed above the mixing ports 33 and 34 and is preferably an O-ring type seal accommodated in a groove formed in the exterior of the stem V, to the end that the bore 22 remains smooth and uninterrupted. In the first form of the invention the delivery connection D discharges at a level intermediate the top and bottom of the faucet structure, in which case the stem-seal Y involves a pair of axially spaced glands that are operable between the bore 22 and the exterior of the stem, the same as above described. However, in this instance the said glands are accommodated in grooves formed in the stem V above and below a spool portion 60 of reduced diameter therein and which aligns axially with the ports 57 from the above described spool portion 55 in sleeve S. In accordance with the first form of the invention the lower mixing section 44 of the stem V is tubular and in open communication with the discharge chamber above the seat 17, and consequently also with the mixing chamber above said seat when the valve stem V is raised. Further, therefore, the stem V is provided with radial ports 61 opening from a central channel 62 into the reduced portion 60 that establishes an annular discharge chamber placed between the two glands of the stem-seal Y. In practice, the uppermost gland of the stem-seal Y is a double gland involving two closely related O-rings, as shown.

The friction means Z which is provided to restrain relative rotation between the sleeve S and stem V involves a friction ring or sliding clutch that is disposed between the body B and the exterior of the stem V. Because of the closeness of the sleeve S and stem V, and with the presence of the stem-seal Y, revolvement of the sleeve S between positions limited by the stops 28 would ordinarily cause an equivalent rotation of the stem V. Therefore, the friction means Z is provided and which affords resistance to rotation in excess and to the total friction tending to revolve the stem V when the sleeve S is rotated. In practice, the friction involved in the engagement of threads 42 is to be included in the total friction, said total friction which includes the friction of means Z being at least greater than the tendency of stem V as urged by the sleeve S. As shown, the friction means Z is a ring of resilient cross section accommodated in a groove in the stem V engaged against a fixedly positioned bore 65 in the element A. Thus, in addition to the threefold purpose above identified with respect to element A, said element also has incorporated therein said features and function of the friction means Z.

From the structural details hereinabove described, it will be seen that a volume control handle is attached to the stem V by means of a handle screw, and rotation of the said control handle revolves the valve stem V within the element A. A temperature control lever is mounted upon the upstanding columns of the sleeve S by means of a lever retaining nut and rotation of the temperature control lever revolves the said sleeve.

Hot and cold water flows through the ports 13 and 14 respectively and the bottom section 24 of the sleeve S is provided with the ports 33 and 34 so that the rotation of the sleeve will vary the area of fluid inlet. By means of rotational orientation of the sleeve S the temperature of fluid flowing through the valve or faucet is controlled by the balance of fluid flowing through ports 13 and 14 (33 and 34). Referring to the open position of the valve or faucet, it will be seen that fluid flows through the ports 13 and 14 (33 and 34) and into the annular commingling chamber between the sleeve S and stem V. From said commingling chamber fluid flows downwardly into the mixing chamber occurring above the said seat 17 and then into the discharge chamber above said seat, and from there through the channel 62 of the stem to be delivered through the radial ports and through the spout 56.

Referring to the second form of the invention shown in FIGS. 9 and 10, it will be seen that equivalent structures are possible. The valve stem V is provided with screw threads which engage mating screw threads on the nut and stop element A. Thus, the rotation of the volume control handle raises and lowers the valve stem V so as to control the volume of fluid flowing into the valve member through ports 13 and 14 (33 and 34). The temperature of the water is controlled by the rotation of the temperature control lever attached to the sleeve S whereby the sleeve controls the amount of fluid which enters the valve through the ports. The hot and cold water which enters the valve is thereby controlled, and in the second form is discharged from the discharge chamber above the seat 17, for example through the valve and a spout tube 56'. Referring to the closed positioning of the valve or faucet it will be seen that in both forms of the invention metering steps 46 close the ports 33 and 34 prior to the closing of valve 35 against seat 17, whereby the function of said valve 35 and seat 17 is reversed to positive shut-off of the flow of fluid.

Having described only typical preferred forms and applications of our invention, we do not wish to be limited or restricted to the specific details herein set forth, but wish to reserve to ourselves any modifications or variations that may appear to those skilled in the art and fall within the scope of the following claims.

Having described our invention, we claim:

1. A faucet wherein two independently and separately actuable means govern mixing and volume of fluid from at least two inlets, and including:
   (a) an elongated body with a cylindrical bore therein;
   (b) means revolubly engaged within the cylindrical bore in the body and selectively opening the two inlets, said means having seals frictionally engaged within the cylindrical bore in the body, and with a cylindrical bore therein;
   (c) means revolubly engaged with the body to shift reciprocably within the second mentioned cylindrical bore in the first mentioned means and controlling flow from said two inlets respectively, said second mentioned means having seals frictionally engaged within the cylindrical bore in the first mentioned means;
   (d) and friction means intermediate the body and said second mentioned means, affording greater friction than that afforded by the combined frictional engagement of the second mentioned means and seals therefor operable within the said second mentioned bore.

2. A faucet wherein two independently and separately actuable means govern mixing and volume of fluid from at least two inlets, and including:
   (a) an elongated body with a cylindrical bore therein;
   (b) means revolubly engaged within the cylindrical bore in the body and selectively opening the two inlets, said means having seals frictionally engaged within the cylindrical bore in the body, and with a cylindrical bore therein;
   (c) means revolubly and threadedly engaged with the body to shift reciprocably within the second mentioned cylindrical bore in the first mentioned means and controlling flow from said two inlets respectively, said second mentioned means having seals frictionally engaged within the cylindrical bore in the first mentioned means;
   (d) and friction means intermediate the body and said second mentioned means, affording greater friction than that afforded by the combined frictional engagement of the threads of the second mentioned means and of the second mentioned means and seals therefor operable within the said second mentioned bore.

3. A faucet wherein two independently and separately actuable means govern mixing and volume of fluid from at least two inlets, and including:
   (a) an elongated body with a cylindrical bore therein and having an inwardly faced seat in the lower end of the bore;
   (b) means revolubly engaged within the cylindrical bore in the body and selectively opening the two inlets, said means having seals frictionally engaged within the cylindrical bore in the body above the two inlets, and with a cylindrical bore therein;
   (c) means revolubly engaged with the body to shift reciprocably within the second mentioned cylindrical bore in said first mentioned means and controlling flow from said two inlets respectively and engageable with the said seat to stop flow from the body, said second mentioned means having seals frictionally engaged with the cylindrical bore in the first mentioned means above the two inlets;
   (d) and friction means intermediate the body and said second mentioned means, affording greater friction than that afforded by the combined frictional engagement of the second mentioned means and seals therefor operable within the said second mentioned bore.

4. A faucet wherein two independently and separately actuable means govern mixing and volume of fluid from at least two inlets, and including:
   (a) an elongated body with a cylindrical bore therein and having an inwardly faced seat opening into a closed chamber at the lower end of the body;
   (b) means revolubly engaged within the cylindrical bore in the body and selectively opening the two inlets, said means having spaced seals frictionally engaged within the cylindrical bore in the body above the two inlets, and with a cylindrical bore therein;
   (c) means revolubly engaged with the body to shift reciprocably within the second mentioned bore in said first mentioned means and controlling flow from said two inlets respectively and engageable with the said seat to stop flow from the second mentioned bore and into said chamber, said second mentioned means having spaced seals frictionally engaged within the cylindrical bore in the first mentioned means above the two inlets;
   (d) said spaced seals of the two said means being correspondingly placed so as to embrace a fluid passage extending from the lowermost end of the second mentioned means and opening radially therethrough into a radial opening in the first mentioned means for discharge from a lateral spout projecting from the body.

5. A faucet in which two elements are independently actuable to govern mixing and volume of fluid from at least two inlets and comprising:
   (a) an elongated body having two fluid inlets and an outlet, the body including a cylindrical bore entering one end of the body and terminating in a discharge chamber with a valve seat contiguous to the other end of the body;
   (b) a mixing element comprising a cylindrical sleeve revolvably engaged within the cylindrical bore in the body, a cylindrical bore extending through the sleeve, said sleeve having circumferentially spaced ports therethrough opening at the cylindrical exterior and into the bore therein for selective rotative registration with two inlets respectively;
   (c) a volume element comprising a stem reciprocally engaged within the cylindrical bore in the sleeve, the stem being of reduced diameter adjacent its ends and having a valve element at the end thereof sealably engagable with valve seat in the body; and
   (d) a nut and stop element having portions engaging the elongated body and the stem, a said portion engaging the body acting to immobilize the nut and stop element relative to the body, a said portion engaging the stem including means co-acting with the stem on rotation thereof to reciprocate the stem.

6. The faucet of claim 5, wherein means acting between portions of the nut and stop element and the mixing element limit revolvement of the mixing element relative to the body.

7. The faucet of claim 5, wherein a first seal means on the sleeve engaging the cylindrical bore in the body affords greater frictional resistance therebetween than a second seal means on the stem in frictional engagement with the sleeve, whereby to permit rotation of the stem independent of the sleeve.

8. The faucet of claim 7, wherein a friction means on the stem engaging the nut and stop element affords greater frictional resistance therebetween than the frictional resistance of the second seal means between the stem and sleeve, whereby to permit rotation of the sleeve independent of the stem.

9. The faucet of claim 8, wherein said friction means is a friction ring affording greater frictional resistance than either of said first and second seal means.

References Cited

UNITED STATES PATENTS

| | | | |
|---|---|---|---|
| Re. 25,920 | 11/1965 | Moen | 137—636.4 |
| 2,158,342 | 5/1939 | Trader | 137—637.4 |
| 2,661,925 | 12/1953 | Barkelew | 137—637.4 X |
| 2,693,826 | 11/1954 | Vaughan | 137—637.2 |
| 2,843,150 | 7/1958 | Goodwin | 137—637.2 |
| 3,166,292 | 1/1965 | Forman | 251—368 |
| 3,170,669 | 2/1965 | Roos | 251—160 |

FOREIGN PATENTS 1,029,638    5/1958    Germany.

CLARENCE R. GORDON, *Primary Examiner.*